Figure 1:
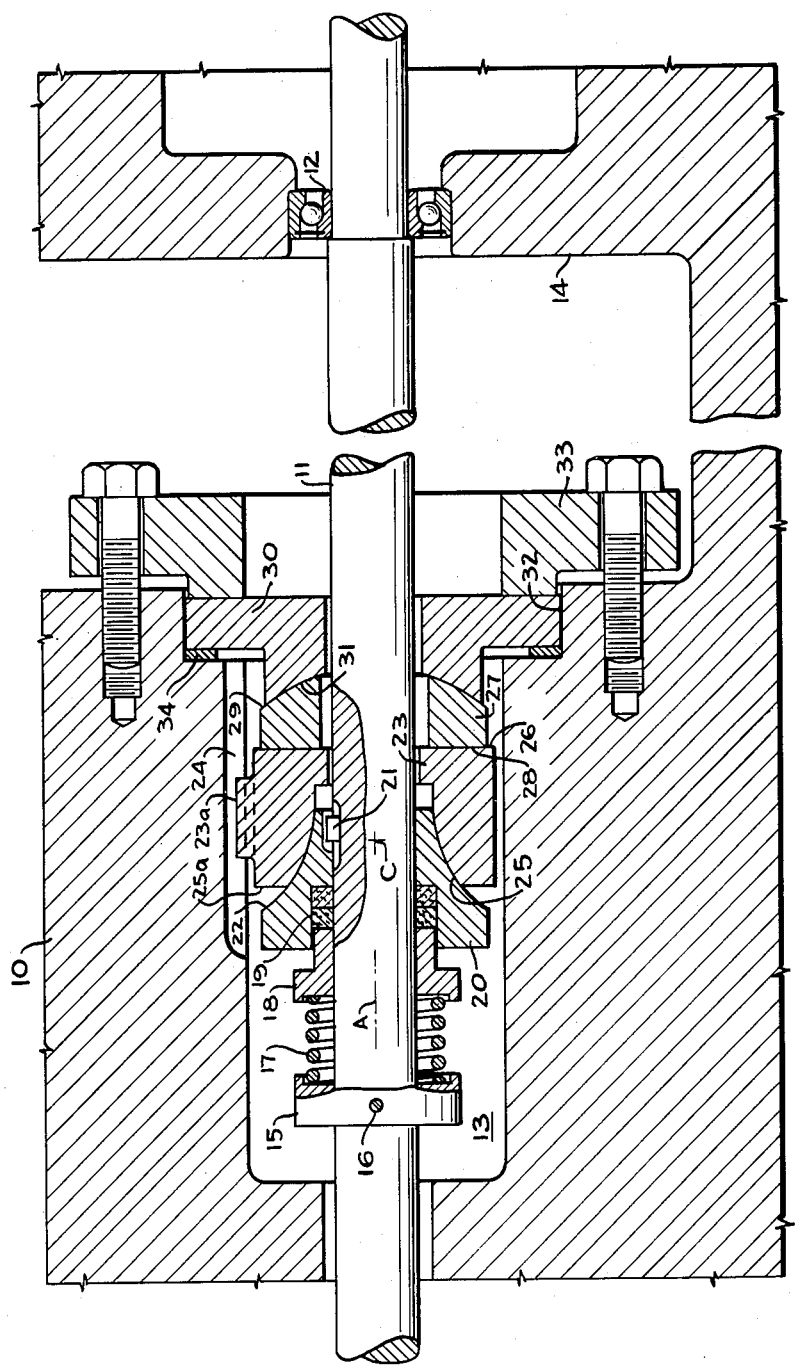

May 8, 1956  E. B. WIST  2,744,774
SHAFT-SEAL

Filed May 6, 1952  2 Sheets-Sheet 1

INVENTOR:
EDWARD B. WIST
BY: Oswald H. Milmore
HIS ATTORNEY

May 8, 1956  E. B. WIST  2,744,774

SHAFT-SEAL

Filed May 6, 1952  2 Sheets-Sheet 2

INVENTOR:
EDWARD B. WIST
BY: Oswald H. McImore
HIS ATTORNEY

United States Patent Office 2,744,774
Patented May 8, 1956

1

2,744,774

SHAFT-SEAL

Edward B. Wist, Orinda, Calif., assignor to Shell Development Company, Emeryville, Calif., a corporation of Delaware Application May 6, 1952, Serial No. 286,263

14 Claims. (Cl. 286—11.15)

This invention relates to shaft-seals for sealing rotatable shafts with respect to walls, such as walls of pump housings and the like. The invention is concerned particularly with a seal having a plurality of sealing rings or the like stacked end-to-end and providing at least three pairs of working faces of special shapes to correct for misalignment of the shaft or rotatable sealing rings, such as is caused by bending of the shaft when under load or by permanent misalignment, or by an inexact alignment of the seal ring on the shaft, and may be applied for pressure as well as vacuum service. The invention finds especial, although not exclusive, application in service where the usual elastomeric gaskets, customarily used in shaft-seals to allow for misalignment, are subject to rapid deterioration due to the aggressive nature of the fluids, either liquid or gaseous, in contact therewith or because the seal is operated at high temperatures.

The usual shaft-seals provide a rotating seal ring mounted on the shaft in fluid-tight relation, e. g., directly or on a separate shaft-sleeve, having a flat annular working face in running contact with a non-rotating ring, often called the stationary ring, that likewise has a flat face and is in fluid-tight relation to the housing wall. The flat faces are mounted substantially perpendicular to the axis of rotation to permit relative lateral displacement of the axes of the rotating and non-rotating rings; however, shaft or ring misalignment usually involves also an inclination of the axis of the rotating ring from the axis of rotation, resulting in a wobbling motion of the working face. If the two rings are to remain in sealing relation throughout the rotation of the shaft at least one of the rings must be free to oscillate through small angles about axes transverse to the shaft. This movement is often facilitated by backing up the non-rotating ring with an elastomeric gasket or mounting it against a spherical seat, whereby it can rock.

When toxic or highly lachrymatory fluids are handled, it is important that such seals be reliably fluid-tight. Leakage from stuffing boxes cannot be risked because of hazards to personnel, and even the rate of leakage of such fluids into smothering streams of water, often circulated outside of the seal, must be strictly limited due to the difficulty of disposing of the effluent stream. It is, further, desirable that the shaft-seals have long life, permitting extended operation without servicing. Difficulties have been experienced with the known seals due to rapid deterioration. The elastomeric gaskets of various types are found to be subject to rapid deterioration when used with aggressive fluids such as acrolein, in that the non-rotating ring is impressed into the gasket by permanent compression set of the gasket material under the action

2 of the acrolein. Destruction of elastomeric gaskets by corrosive action of or solution in the fluid is also common. Similar difficulties are encountered in high temperature service, when heat-resistant packings often provide poor elastic and sealing characteristics.

Even when the elastomeric gasket is eliminated by substituting therefor a metal to metal seal consisting of a carefully ground spherical working face on the non-rotating ring and a mating face on the support therefor, the useful life of the known seals (as limited by the allowable leakage rate) is often limited by unreliability of the flat working faces. This derives from the fact that the flat working faces perform two separate functions: They effect a seal between the contacting rings that are relatively rotating, and further permit lateral relative displacement between the longitudinal axes of the rings. In the absence of lateral motion, the rings tend to wear in such a way that annular wear patterns result, which are usually effective for sealing so long as rotation continues about a common axis; however, when the flat surfaces additionally slide laterally, the annular wear patterns on the two rings, which include fine ridges and grooves, become eccentric, resulting in a greater rate of wear and in increased leakage.

It is, therefore, an object of the invention to provide an improved shaft-seal wherein the several functions of providing for (a) relative rotation, (b) lateral displacement and (c) inclination of the axes are performed by separate pairs of working faces, each shaped to perform its specific function.

A further object is to provide an improved seal having no elastomeric sealing gasket that is subject to variable strain during rotation of the shaft that is dependable, has long life, and a low, acceptable rate of leakage, and is suitable for use with aggressive fluids and/or at high temperatures.

Still another object of the invention is to provide an improved shaft-seal of the type described wherein a Schiele pivot is employed.

In summary, according to the invention, there is a stack of at least four sealing rings, disposed end-to-end and in mutual contact along mating sealing faces of special shapes, one terminal ring being in fluid-tight relation to the shaft, the other terminal ring being in fluid-tight relation to the stationary wall, and the shapes of the three consecutive pairs of mating working faces being such that one pair permits relative rotation of the respective rings about a common axis, a second pair permits the longitudinal axes of the respective rings to be displaced laterally, while a third pair permits the longitudinal axes of the respective rings to incline. All three pairs of contacting working faces are exposed to fluid at the pressure of the high-pressure region at one margin and to the low-pressure region at the other margin, so that they function in parallel instead of in series. When the radially outer parts are exposed to the region of higher pressure leakage at each pair of surfaces is radially inward, and when the region of higher pressure is at the radially inner parts, leakage is radially outward; both of these arrangements fall within purview of this invention. Means are provided for imposing an axial thrust urging the terminal rings toward each other, thereby loading all pairs of mating working faces to reduce leakage. In this connection it can be observed that the loading may be so high as to result in substantially no leakage; this, however, may cause the working faces to run dry and result in a high rate of wear. In many instances, it is preferred to employ lower loading forces, thereby permitting the fluid retained by the shaft-seal to form a liquid or gaseous film between the faces and reducing wear but permitting some leakage, e. g., from two to three drops per minute in the case of liquid. In the case of toxic or obnoxious fluids this leakage of liquid or gas may be carried off by a stream of smothering water or other solvent that is circulated through suitable flow channels at the low pressure side of the seal; such smothering arrangements, being well known as applied to other seals and forming no part of this invention, will not be further described herein.

The axial loading may be effected by any suitable means, which are in themselves known in the art. For purposes of illustration, two means, acting in concert, are shown, viz., a coiled spring acting against a terminal, axially slidable ring, and a face on said ring or on a part such as a gland follower by which thrust can be transmitted to the ring, said face being directed away from the working face of the ring and exposed to the fluid in the region of higher pressure. This is the preferred arrangement. In most installations, the force exerted by the fluid on the said exposed surface exceeds that imposed by the spring, and the spring serves only to keep the rings in initial contact until the fluid pressure acts; in such cases the spring may be omitted entirely. It is, of course, also possible to employ a very stiff spring, making it sometimes unnecessary to arrange the exposed face of the axially slidable ring in the manner described above.

The pair of contacting working faces that constrains the respective rings to rotate about a common axis may have any surface of revolution different parts of which are generated by progressively increasing radii (thereby permitting the transmission of axial loading stress) and which is not the surface of a sphere (thereby preventing relative canting of the axes), the term "surface of revolution" being herein used exclusive of flat surfaces. Three such geometric shapes are particularly advantageous for the first pair of surfaces: (1) Schiele's pivot, that is, the surface of revolution generated by the revolution of a tractrix about its axis, the said axis being coincident with the common axis of the rings in question, having the characteristic of wearing uniformly at all parts thereof; (2) a frusto-conical surface; and (3) a surface of revolution generated by revolving about the common axis of the rings the arc of a circle whose center is offset from the axis.

The pair of contacting working faces that permits lateral displacement are flat and annular, and are situated in a plane that is substantially perpendicular to the shaft axis.

The pair of faces that permits inclination of the axes are parts of a sphere. It is preferred that the center of curvature of the sphere be on or near the axis of the shaft, either toward or away from the supporting bearing.

The working faces should all be carefully ground to conform to the required geometric shapes. In the case of the spherical and also in that of the flat faces, it is advantageous to employ random lapping. Lapping may be accomplished by grinding the mating faces against each other or by use of a master lap.

While, for convenience, reference is made herein to two mating surfaces lying in a stated geometric surface, it should be understood that in actuality, such surfaces are often separated by minute distances to accommodate a film of fluid that gradually works its way from the high-pressure region toward the low-pressure region, as indicated above. The expressions "in contact" and "in running contact" are, accordingly, intended to include relationships wherein the parts are separated by minute films.

Figure 2:
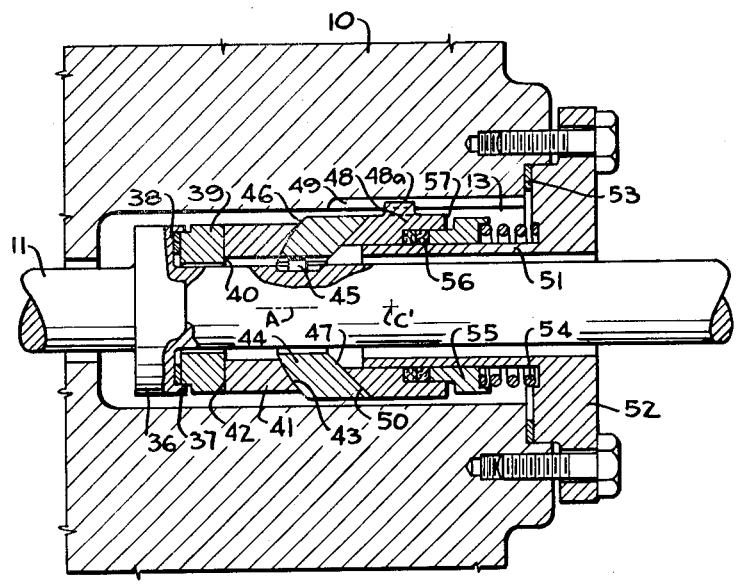
Figure 3:
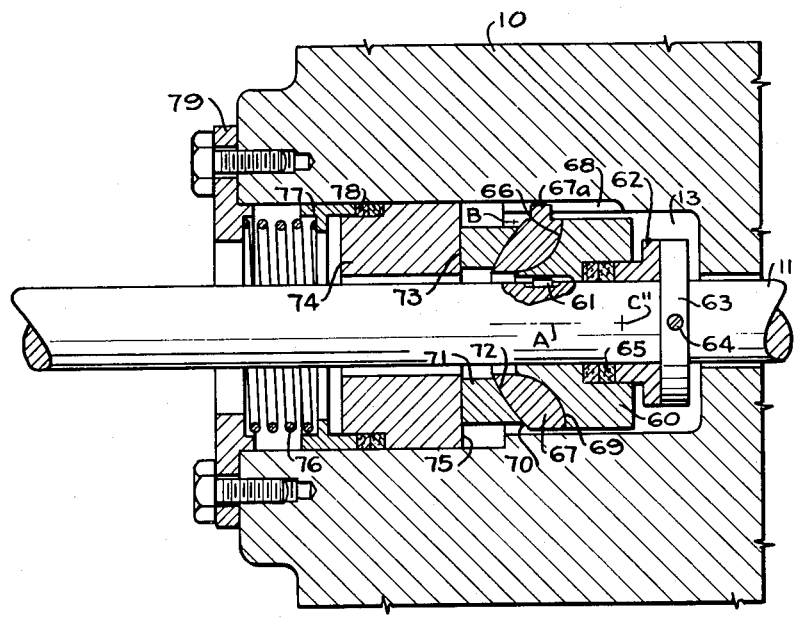

Having thus stated the general nature of the invention, reference is made to the accompanying drawings forming a part of this specification and illustrating certain illustrative embodiments of the invention, wherein:

Figures 1, 2 and 3 are longitudinal sectional views of three different constructions in accordance with the invention.

While the constructions shown in the several views differ in various features, including the shapes of the sealing rings, their sequence, their arrangement with respect to the shaft and the housing wall, and the manner of disposing the spring for end-loading the rings, it should be understood that these features can in most instances be interchanged individually, and that these features are not necessarily employed in groups as illustrated.

Referring first to Figure 1 in detail, there is shown a wall 10 through which extends a rotatable shaft 11 having one or more bearings of which only the radial-thrust bearing 12 is shown. The wall 10 may, for example, be a part of a pump housing having an elongated chamber 13 into which the shaft extends. When the pump is operated under pressure (as opposed to vacuum service) the chamber 13 will be a region of higher pressure while the outside is the region of lower pressure and the invention concerns itself with effecting a seal between this housing and the shaft. The shaft may, for example, have a pump impeller (not shown) within the pump housing to the left of the housing wall 10 and the shaft may be driven by any suitable drive (not shown) at the right. The bearing 12, which is mounted in a bearing block 14 that is fast to the housing wall 10, affords thrust support against axial movement of the shaft to the right, from the region of higher pressure to the region of lower pressure.

The shaft 11 carries a removable collar 15, secured by a set screw 16 and forming an abutment for a coiled spring 17 that urges a gland follower 18 away from the high pressure region, against packing material 19. The packing material seals a first or terminal seal ring 20 to the shaft in fluid-tight relation. This seal ring has a sliding fit on and a limited axial movement along on the shaft, but is secured rotationally with respect to the shaft by means of a key 21 inserted in key-way formed in the ring and in the shaft. The ring has a first annular working face 22 that is a surface of revolution concentric with the axis A of the shaft 11 and formed by revolving a tractrix about its axis, i. e., it has a surface corresponding to Schiele's pivot. This face is in running contact with a second, non-rotatable sealing ring 23 that is freely movable within the housing both axially and radially, but is rotationally secured by means of a longitudinal fin 23a on the ring which is slidable in a longitudinal groove 24 formed in the wall 10. The second ring has at the end toward the region of higher pressure a second annular working face 25 that conforms in shape to the surface 22, and at the other end a third annular working face 26 which is flat and situated in a plane that is perpendicular to the axis of the surface of revolution of the face 25. A part 25a of the left end of ring 23 extends radially beyond the working face 25. A third, non-rotating sealing ring 27, also of lesser diameter than the chamber 13 of the housing wall, has at one end thereof a fourth working face 28, which is annular and flat and is in contact with the third working face 26. The end of the third ring toward the region of lower pressure is shaped as a part of a sphere having its center of curvature at a point C on the axis A of the shaft and constitutes a fifth annular working face 29. A fourth or terminal sealing ring 30 has a sixth annular working face 31 that conforms to the part-spherical shape of the face 29. It should be noted that the three rings 23, 27 and 30 have bores larger than the diameter of the shaft 11 to permit relative radial movement between the shaft and the rings. The space inside of these rings is hence at a low pressure. The fourth ring 30 is mounted in fluid-tight relation to the housing wall 10 to close communication between the chamber 13 around the other sealing rings. This ring fits into a recess 32 in the housing wall and is held by a gland follower 33 that is bolted to the housing wall; a gasket 34 may be placed between the housing wall and the fourth sealing ring. This gasket is restrained against being blown outward radially by the peripheral wall of the recess 32 and may be made of corrosion-resistant material and/or temperature-resistant material, such as asbestos, or a soft metal since it is not subject to flexure or variable strain in accordance with the angular position of the shaft.

In operation, with the chamber 13 subjected to fluid pressure higher than the outside of the housing, the pressure urges the shaft to the right, but axial displacement is prevented by bearing means, such as the radial-thrust bearing 12. This pressure also acts on the gland follower 18 and the first ring 20, urging them to the right and increasing the loading on the contacting working faces beyond the loading imposed by the spring 17. Further, the annular part 25a which is exposed to fluid in the higher pressure region and is not in contact with the working face on the first ring, causes additional loading on the working faces to the right of the ring 23.

When the shaft 11 is rotated, the first ring 20 turns therewith relatively to the non-rotating ring 23. It is evident that the working faces 22 and 25, being surfaces of revolution that are not parts of a sphere, constrain the rings 20 and 23 to relative rotation about a common axis. Any eccentricity of the shaft 11 (and therewith of the ring 20) as well as any angular deviation of the shaft axis (and therewith of the ring 20) will be transmitted to the non-rotating second ring 23. The geometric shape of the contacting working faces between these rings assures good wearing qualities and provides a minimum of leakage over extended periods of operation. Since such surfaces wear uniformly these parts are able to maintain their sealing relationship accompanied by a small elongation of the spring 17.

The eccentric movement of the ring 23 is "washed out" between the flat faces 26 and 28 which are free for relative radial movement, whereby the longitudinal axes of the rings 23 and 27 can be displaced relatively to each other. The tilting movements of the rings 20 and 23 are, however, transmitted to the ring 27, so that the faces 26 and 28 always remain parallel. There is no relative rotation or canting between the rings 23 and 27.

The spherical surfaces 29 and 31 permit the ring 27 to rock in any direction with respect to the terminal stationary ring 30, thereby permitting the axis of these rings to be inclined. It will be noted that the last-mentioned ring further positions the third ring 27 radially. There is no relative rotation between the rings 27 and 30.

Although the ring 27 is not positively secured against rotation, it is evident that it is a non-rotating ring because both ends thereof work against non-rotating rings and there is no torque applied thereto. Hence, the second pair of contacting surfaces 26 and 28 are subjected only to sliding movement in substantially radial directions while the third pair of contacting working surfaces 29 and 31 are subjected only to relative tilting movements, which may assume various paths depending upon the nature of the shaft mis-alignment, e. g., along meridians of the sphere, regarding the polar axis as coincident with the shaft axis. These sliding and tilting movements are very small in magnitude and impose only small wear on the faces 26, 28, 29 and 31, whereby these faces have long service life and can be operated with extremely low leakage rates and high loadings.

Referring to Figure 2, the shaft 11 is shown passing through a housing wall 10 having a chamber 13. This shaft has a collar 36 at the end of the seal nearer the high pressure side (assumed to be toward the left). This collar has an annular flange 37 for retaining a gasket 38 which provides a seal for a first sealing ring 39, retaining the latter in fluid-tight relation to the shaft and secured against axial movement toward the left. The end of this ring toward the low pressure region has a flat annular working face 40 disposed perpendicularly to the shaft axis A. A second ring 41 has at one end thereof a second annular working face 42 which is flat and in contact with the first face 40. The other end of this ring has a third annular working face 43 that is part of the surface of a sphere having its center of curvature at C', substantially on the axis A of the shaft 11. A third sealing ring 44 is secured for rotation with the shaft by means of a key 45 which permits axial movement of the ring along the shaft. This ring has a fourth annular working face 46 at one end thereof in contact with the working face 43 and likewise of part-spherical shape with its center of curvature at C'. The other end of the third ring has a fifth annular working face 47 with the shape of a frustum of a cone. A fourth annular sealing ring 48 is secured against rotation by means of a fin 48a on the ring which is slidable in a longitudinal groove 49 formed in the wall 10. This ring has at the end toward the high pressure region a sixth annular working face 50 that is in contact with and conforms to the shape of the face 47. The bores of the rings are larger than the diameter of the shaft 11, the clearance at least in the case of the last three rings 41, 44 and 48 being sufficient to permit radial movement between the shaft and the rings. The fourth ring 48 further has a sliding fit about a sleeve 51 that surrounds the shaft with an annular clearance and is formed integrally with a closure 52 that is bolted to the wall 10 to close the end of the chamber 13. The closure 52 may be provided with a gasket 53 that may be selected as described for the gasket 34. A coiled compression spring 54 surrounding the sleeve 51 presses a gland follower 55 into an annular recess of the ring 48 containing packing material 56, whereby the ring is made fluid-tight with respect to the housing wall 10 and the several rings are urged to the left against the ring 36 and shaft 11. It will be noted that the chamber 13 is larger than the external dimensions of the rings, whereby the right face 57 of the fourth ring and the right face of the gland follower 55, although directed toward the region of lower pressure, are exposed to the pressure of fluid in the region of higher pressure. This pressure, together with that acting on the ring 36, loads the working faces beyond the loading of the spring 54, as in the previous embodiment.

In the operation of the second embodiment, the frusto-conical working faces 47 and 50 constrain the rotating ring 44 to rotate on an axis that is common to the non-rotating ring 48. Any eccentricity of the shaft due to the mis-alignment is washed out by radial movement between the sealing rings 39 and 41 but inclinations of the shaft axis from the axis of rotation are transmitted to the ring 41; the latter inclinations are washed out by movement between the rings 41 and 44. The ring 41 rotates with the shaft because it is held between rotating rings 39 and 44.

The shaft 11 in this embodiment may be supported in any suitable bearings, which may for example, include a bearing to the right in the region of lower pressure, as illustrated in Figure 1. It will be noted that in this instance the center of curvature C' is toward the low pressure region as distinguished from the arrangement of Figure 1.

Referring to Figure 3, there is shown an embodiment suitable for vacuum applications wherein the housing wall 10 has a chamber 13 which is subjected to vacuum and forms the region of lower pressure, the shaft 11 extending out of the chamber to the atmosphere at the left, which is the region of higher pressure. The shaft 11 may in this case be provided with bearings (not shown) in the region of higher pressure outside of the recess 13 affording thrust support against movement of the shaft into the region of lower pressure.

The seal comprises a first, rotating ring 60, which is keyed to the shaft by key 61 and is restrained against movement to the low pressure region by a gland follower 62 and a collar 63, the latter being secured to the shaft by a set screw 64. This ring is made fluid-tight to the shaft by the packing material 65. The ring has a first annular working face 66 having the shape of a surface generated by revolving an arc of a circle about the shaft axis A, said circle having the center of curvature B offset from the shaft axis. Thus, the contour of the surface 66 on the axial plane of the drawing includes the arc of a circle having its center offset from the shaft axis.

A second sealing ring 67 is restrained against rotation by a fin or projection 67a on the ring which is slidable in a longitudinal groove 68 in the housing wall 10, the ring being left free to move axially. It has a second annular working face 69 that is in contact with and conforms to the shape of the first working face 66. It has further a third annular working face 70 that is shaped as a part of the sphere having its center of curvature at a point C'' on the axis A. A third sealing ring 71 has at one end thereof a fourth annular working face 72 in contact with and conforming to the shape of the part-spherical surface 70, and at the other end thereof a fifth annular working face 73 that is flat and situated in a plane perpendicular to the axis A. A fourth sealing ring 74 is axially slidable within the chamber 13 and has a sixth annular working face 75 that is in contact with the fifth annular working face 73. The several rings are initially loaded by means of a spring 76 that bears against a gland follower 77 and compresses packing material 78 to effect a fluid-tight seal between the fourth ring 74 and the wall 10. The spring is secured by a retaining ring 79 which is bolted to the end of the wall. It will be noted that in this instance, again, the ring that is acted upon by the compression spring for loading the working faces has the surface thereof away from its working face exposed to the higher pressure fluid. When a vacuum is applied to the chamber 13, these faces are further loaded due to differential pressure.

In this embodiment, the working faces 66 and 69 constrain the rings 60 and 67 to relative rotation on a common axis, whereby eccentricities and inclinations of the shaft 11 are transmitted to the ring 67. The latter can rock within the ring 71 so that only radial movements are transmitted to the ring 71. These radial movements are washed out by motion between rings 71 and 74.

This embodiment differs from the previous arrangements in that the leakage is radially outward between the contacting working faces.

I claim as my invention:

1. A shaft-seal for sealing a rotatable shaft with respect to a wall comprising: a rotating annular sealing member in fluid-tight relation to the shaft and rotatable therewith having a first annular working face toward one axial direction; a non-rotating annular sealing member in fluid-tight relation to said wall spaced from said rotating sealing member in the said axial direction and having an annular working face toward said rotating sealing member; and a plurality of intermediate annular sealing members stacked end-to-end between said rotating and stationary sealing members, consecutive intermediate sealing members being in contact along mating annular working faces, one of said intermediate sealing members having a working face in contact with the working face on the rotating sealing member and conforming to the shape thereof and another of said intermediate sealing members having a working face in contact with the working face on the stationary sealing member and conforming to the shape thereof, a first pair of said contacting working faces having surfaces of revolution different parts of which are generated by progressively increasing radii and which are not parts of a sphere to constrain the contacting members to relative rotation on a common axis, a second pair of said contacting working faces being flat and situated in a plane extending transversely to the axis of the shaft to permit relative lateral displacement of the longitudinal axes of the contacting member, and a third pair of said contacting working faces being parts of a sphere to permit relative inclination of the contacting members.

2. A shaft-seal according to claim 1 wherein said first pair of contacting working faces have the shape of a surface generated by the revolution of a tractrix about its axis.

3. A shaft-seal according to claim 1 wherein said first pair of contacting working faces have the shape of a frustum of a cone.

4. A shaft-seal according to claim 1 wherein the contour of the surface of revolution of said first pair of contacting working faces on an axial plane includes the arc of a circle having its center offset from the axis of the shaft.

5. A shaft-seal according to claim 1 wherein the sealing members having the working faces forming said first pair of contacting faces are rotationally restrained, one with respect to the shaft and the other with respect to the wall, whereby relative rotation occurs at said first pair of working faces when the shaft is rotated.

6. A shaft-seal for sealing a rotatable shaft with respect to a wall comprising: a first annular sealing member in fluid-tight relation to the shaft and rotatable therewith having a first annular working face; a second annular sealing member having a second working face in contact with said first working face and conforming to the shape thereof and having a third annular working face; a third annular sealing member having a fourth working face in contact with said third working face and conforming to the shape thereof and having a fifth annular working face; and a fourth sealing member having a sixth working face in contact with said fifth working face and conforming to the shape thereof, a first pair of said contacting working faces having surfaces of revolution different parts of which are generated by progressively increasing radii and which are shaped to constrain the contacting members to relative rotation on a common axis; a second pair of said contacting working faces being flat and extending transversely to the axis of the shaft to permit relative lateral displacement of the longitudinal axes of the contacting members, and the third pair of said contacting working faces being parts of a sphere to permit relative inclination of the contacting members.

7. A shaft-seal for sealing a rotatable shaft with respect to a housing comprising: a first annular sealing member in fluid-tight relation to the shaft having a first annular working face toward one axial direction; a second annular sealing member having a second working face in contact with the first working face and conforming to the shape thereof and having a third annular working face toward said one axial direction; a third annular sealing member having a fourth working face in contact with the third working face and conforming to the shape thereof and having a fifth annular working face toward said one axial direction; a fourth sealing member in fluid-tight relation to the housing and supported thereby having a sixth working face in contact with said fifth working face and conforming to the shape thereof, a first pair of said contacting working faces having surfaces of revolution different parts of which are generated by progressively increasing radii and which are not parts of a sphere to constrain the contacting members to relative rotation on a common axis, a second pair of said contacting working faces being flat and situated in a plane substantially perpendicular to the axis of the shaft to permit relative lateral displacement of the longitudinal axes of the contacting members, and the third pair of said contacting working faces being parts of a sphere having the center of curvature substantially on the axis of the shaft to permit relative inclination of the longitudinal axes of the contacting members, said first and fourth sealing members being relatively movable in an axial direction; means urging said first and fourth sealing members together to load said pairs of contacting working surfaces; and means rotationally securing the sealing members that have the working faces constituting said first pair of contacting faces, the member toward said first annular sealing member being secured to rotate with the shaft and the other member being secured against rotation relatively to the housing, whereby relative rotation between working faces occurs only at the said first pair of contacting faces when the shaft is rotated.

8. A shaft-seal for sealing a housing wall with respect to a shaft that extends through said wall from a region of lower pressure to a region of higher pressure, said shaft being mounted for rotation by bearing means affording thrust support against axial movement of the shaft at least in the axial direction from the region of higher pressure toward the region of lower pressure, said seal comprising: a pair of terminal annular sealing members surrounding said shaft spaced apart axially and having annular working faces directed toward each other, a first of said terminal members being supported on the shaft in fluid-tight relation for rotation therewith and the said other terminal member being non-rotationally supported by said wall in fluid-tight relation, at least one of said terminal members being mounted for axial movement relatively to its support and having means for urging it toward the other terminal member, said means including a surface directed away from the working face of the said one terminal member exposed to the pressure in said higher pressure region; abutment means between each terminal member and the respective support therefor for limiting axial movements of the members away from one another, at least the abutment means for said one member including a spring; and a plurality of intermediate annular sealing members surrounding said shaft and stacked end-to-end between said terminal sealing members, consecutive intermediate sealing members being in contact along mating annular working faces, one of said intermediate sealing members having a working face in contact with the working face on one of said terminal sealing members and conforming to the shape thereof and another of said intermediate sealing members having a working face in contact with the working face on the other terminal sealing member and conforming to the shape thereof, a first pair of said contacting working faces having surfaces of revolution different parts of which are generated by progressively increasing radii and which are not parts of a sphere to constrain the contacting members to relative rotation on a common axis, a second pair of said contacting working faces being flat and situated in a plane extending transversely to the axis of the shaft to permit relative lateral displacement of the longitudinal axes of the contacting members, and a third pair of said contacting working faces being parts of a sphere to permit relative inclination of the longitudinal axes of the contacting members.

9. A shaft seal for a shaft extending through the wall of a housing between a region of lower pressure and a region of higher pressure and mounted for rotation by bearing means, said seal comprising a first sealing ring surrounding said shaft in fluid-tight relation and axially slidable thereon; means for urging said first ring to move axially in one axial direction, said means including a surface exposed to the pressure in said region of higher pressure, said first ring having a first annular working face toward the said one axial direction; resilient means on the shaft for further urging said first ring toward said one axial direction; a second sealing ring surrounding the shaft having a second annular working face in contact with the first working face and conforming to the shape thereof and having a third annular working face toward the said one axial direction; a third sealing ring surrounding the shaft having a fourth annular working face in contact with the third working face and conforming to the shape thereof and having a fifth annular working face toward the said one axial direction; a fourth sealing ring surrounding the shaft in fluid-tight relation to the housing and carried thereby having a sixth working face in contact with said fifth working face and conforming to the shape thereof, a first pair of said contacting working faces having surfaces of revolution different parts of which are generated by progressively increasing radii and which are not parts of a sphere to constrain the contacting rings to relative rotation about a common axis, a second pair of said contacting working faces being flat and situated in a plane substantially perpendicular to the axis of the shaft to permit relative lateral displacement of the longitudinal axes of the contacting rings, and the third pair of said contacting working faces being parts of a sphere having the center of curvature substantially on the axis of the shaft to permit relative inclination of the longitudinal axes of the contacting rings; and means rotationally restraining the rings having the working faces forming said first pair of contacting working faces, the ring toward the said one axial direction being restrained against rotation relatively to the housing and the other ring being restrained to rotate with the shaft, whereby relative rotation occurs at said first pair of working faces when the shaft is rotated.

10. The combination according to claim 9 wherein the said first pair of contacting working faces have the shape of a surface generated by the revolution of a tractrix about its axis.

11. The combination according to claim 9 wherein said one axial direction is toward the region of lower pressure.

12. A shaft seal for a shaft extending through the wall of a housing between a region of lower pressure and a region of higher pressure and mounted for rotation by bearing means, said seal comprising a first sealing ring surrounding said shaft in fluid-tight relation having a first annular working face toward one axial direction; a second sealing ring surrounding the shaft having a second annular working face in contact with the first working face and conforming to the shape thereof and having a third annular working face toward the said one axial direction; a third sealing ring surrounding the shaft having a fourth annular working face in contact with the third working face and conforming to the shape thereof and having a fifth annular working face toward the said one axial direction; a fourth sealing ring surrounding the shaft in fluid-tight relation to the housing and axially slidable relatively thereto having a sixth annular working face in contact with the fifth working face and conforming to the shape thereof; means for urging said fourth ring toward the said first ring, said means including a surface exposed to the pressure in said region of higher pressure thereby loading said contacting working faces; resilient means for further urging said fourth ring toward the said first ring, a first pair of said contacting working faces having surfaces of revolution different parts of which are generated by progressively increasing radii and which are not parts of a sphere to constrain the contacting rings to relative rotation about a common axis, a second pair of said contacting working faces being flat and situated in a plane substantially perpendicular to the axis of the shaft to permit relative lateral displacement of the longitudinal axes of the contacting rings, and the third pair of said contacting working faces being parts of a sphere having the center of curvature substantially on the axis of the shaft to permit relative inclination of the longitudinal axes of the contacting rings; and means rotationally restraining the rings having the working faces forming said first pair of working faces, one ring being restrained to rotate with the shaft and the other ring being restrained against rotation relatively to the housing, whereby relative rotation occurs at said first pair of working faces when the shaft is rotated.

13. The combination according to claim 12 wherein the said first pair of contacting faces have the shape of a frustum of a cone.

14. The combination according to claim 12 wherein the contour of the surface of revolution of said first pair of contacting working faces includes the arc of a circle having its center offset from the axis of the shaft.

References Cited in the file of this patent

UNITED STATES PATENTS

| | | |
|---|---|---|
| 626,129 | Badeker | May 30, 1899 |
| 743,154 | Edwards et al. | Nov. 3, 1903 |
| 1,491,992 | McCuen | Apr. 29, 1924 |
| 1,898,278 | Weis | Feb. 21, 1933 |
| 1,993,268 | Ferguson | Mar. 5, 1935 |
| 2,121,299 | Peters | June 21, 1938 |
| 2,339,099 | Namur | Jan. 11, 1944 |
| 2,422,007 | Gilbert | June 10, 1947 |
| 2,462,481 | Estey | Feb. 22, 1949 |
| 2,571,257 | Kinsella | Oct. 16, 1951 |

FOREIGN PATENTS

| | | |
|---|---|---|
| 455,453 | Italy | Mar. 1, 1950 |
| 666,125 | Great Britain | Feb. 6, 1952 |